(12) United States Patent
Visweswara et al.

(10) Patent No.: US 12,061,626 B2
(45) Date of Patent: Aug. 13, 2024

(54) TECHNIQUES FOR MANAGING A COLLABORATIVE DATA MANAGEMENT AND DELIVERY PLATFORM

(71) Applicant: EVOCALIZE, INC., Seattle, WA (US)

(72) Inventors: Sharat Visweswara, Seattle, WA (US); Daniel Lawless, Seattle, WA (US); Tyler Seaton, Seattle, WA (US); Matthew Marx, Seattle, WA (US)

(73) Assignee: EVOCALIZE, INC., Seattle, WA (US)

( * ) Notice: Subject to any disclaimer, the term of this patent is extended or adjusted under 35 U.S.C. 154(b) by 78 days.

(21) Appl. No.: 17/865,554

(22) Filed: Jul. 15, 2022

(65) Prior Publication Data

US 2023/0016793 A1 Jan. 19, 2023

Related U.S. Application Data

(60) Provisional application No. 63/222,806, filed on Jul. 16, 2021.

(51) Int. Cl.
*G06F 9/44* (2018.01)
*G06F 16/28* (2019.01)
*G06Q 30/0251* (2023.01)

(52) U.S. Cl.
CPC ....... *G06F 16/282* (2019.01); *G06Q 30/0251* (2013.01)

(58) Field of Classification Search
CPC .......................... G06F 16/282; G06Q 30/0251
See application file for complete search history.

(56) References Cited

U.S. PATENT DOCUMENTS

| | | | |
|---|---|---|---|
| 9,858,598 B1* | 1/2018 | Sivertsen | G06Q 30/0272 |
| 2009/0192869 A1* | 7/2009 | Irvine | G06Q 30/0212 |
| | | | 705/7.29 |
| 2018/0309695 A1* | 10/2018 | Kimmet | G06F 9/5072 |
| 2022/0200929 A1* | 6/2022 | Giraldo | H04L 47/83 |

* cited by examiner

*Primary Examiner* — Hang Pan
(74) *Attorney, Agent, or Firm* — Barnes & Thornburg LLP

(57) ABSTRACT

Techniques for managing a collaborative data management and deployment platform and generating customizable blueprints for a data deployment program are disclosed. Techniques include receiving one or more parameters for generating the blueprint for the program, receiving a selection of one or more blueprint components satisfying the one or more parameters, and generating the blueprint template as a function of the selected components. In addition, one or more data sets for use in a program are obtained. A selection of the blueprint template is received. Objects of the selected blueprint are mapped to the one or more data sets. The selected blueprint is mapped to one or more third-party data channels.

18 Claims, 8 Drawing Sheets

TECHNIQUES FOR MANAGING A COLLABORATIVE DATA MANAGEMENT AND DELIVERY PLATFORM

CROSS-REFERENCE TO RELATED APPLICATIONS

This patent application claims priority to U.S. Provisional Patent Application Ser. No. 63/222,806, filed Jul. 16, 2021, entitled "Techniques for Managing a Collaborative Marketing Platform," which is herein incorporated by reference in its entirety.

FIELD

The present disclosure relates to data management and delivery, and more specifically, to a collaborative data management and delivery platform providing a blueprint engine for designing customizable data deployment programs.

BACKGROUND

Data management generally relates to techniques used for processing, storing, and organizing data. One form of data management includes distributed marketing, which leverages the Internet and allows brand clients, as data entities, to promote goods and services through networks of local partners, represented in this paradigm as other data entities. Through distributed marketing, brands can share best practices, messaging, audiences, co-op budgets with distributed locations, all represented as data, which is deployed via effective marketing programs on various online channels.

Generally, distributed marketing involves working with large and complex data sets (e.g., data associated with a brand client's goods and services, data associated with marketing campaigns, target customer data, etc.) to design and implement a given marketing program. Because such programs involve managing enormous amounts and a wide variety of types of data, tailoring such data to a particular program to be effective can be a challenge.

SUMMARY

Embodiments presented herein disclose a computer-implemented method for generating an organized collection of data inputs for a data deployment program. The computer-implemented method generally includes receiving, from a client device and by a platform server, a specification of one or more parameters to be satisfied for the data deployment program. The computer-implemented method also generally includes presenting, via a graphical user interface to a second client device and by the platform server, the specification of the one or more parameters and a plurality of objects. Each of the objects are mappable to a data set maintained or accessible by the platform server. A selection of one or more of the plurality of objects satisfying the specification of the one or more parameters is received via the graphical user interface and by the platform server. One or more hierarchical definitions to be associated with the selection of the one or more of the plurality of objects are received via the graphical user interface and by the platform server. A template is generated by the platform server for the data deployment program as a function of the selected objects and the one or more hierarchical definitions.

Another embodiment presented herein discloses one or more computer-readable storage media. The one or more computer-readable storage media comprises a plurality of instructions. The plurality of instructions, when executed by a processor, causes a platform server to receive, from a client device, a specification of one or more parameters to be satisfied for a data deployment program. The plurality of instructions further causes the platform server to present, via a graphical user interface to a second client device, the specification of the one or more parameters and a plurality of objects. Each of the objects is mappable to a data set maintained or accessible by the platform server. A selection of one or more of the plurality of objects satisfying the specification of the one or more parameters is received via the graphical user interface. One or more hierarchical definitions to be associated with the selection of the one or more of the plurality of objects are received via the graphical user interface. A template is generated for the data deployment program as a function of the selected objects and the one or more hierarchical definitions.

Yet another embodiment presented herein discloses a platform server. The platform server comprises a processor and a memory. The memory stores a plurality of instructions. The plurality of instructions, when executed by the processor, causes a platform server to receive, from a client device, a specification of one or more parameters to be satisfied for a data deployment program. The plurality of instructions further causes the platform server to present, via a graphical user interface to a second client device, the specification of the one or more parameters and a plurality of objects. Each of the objects is mappable to a data set maintained or accessible by the platform server. A selection of one or more of the plurality of objects satisfying the specification of the one or more parameters is received via the graphical user interface. One or more hierarchical definitions to be associated with the selection of the one or more of the plurality of objects are received via the graphical user interface. A template is generated for the data deployment program as a function of the selected objects and the one or more hierarchical definitions.

DETAILED DESCRIPTION

Figure 1:
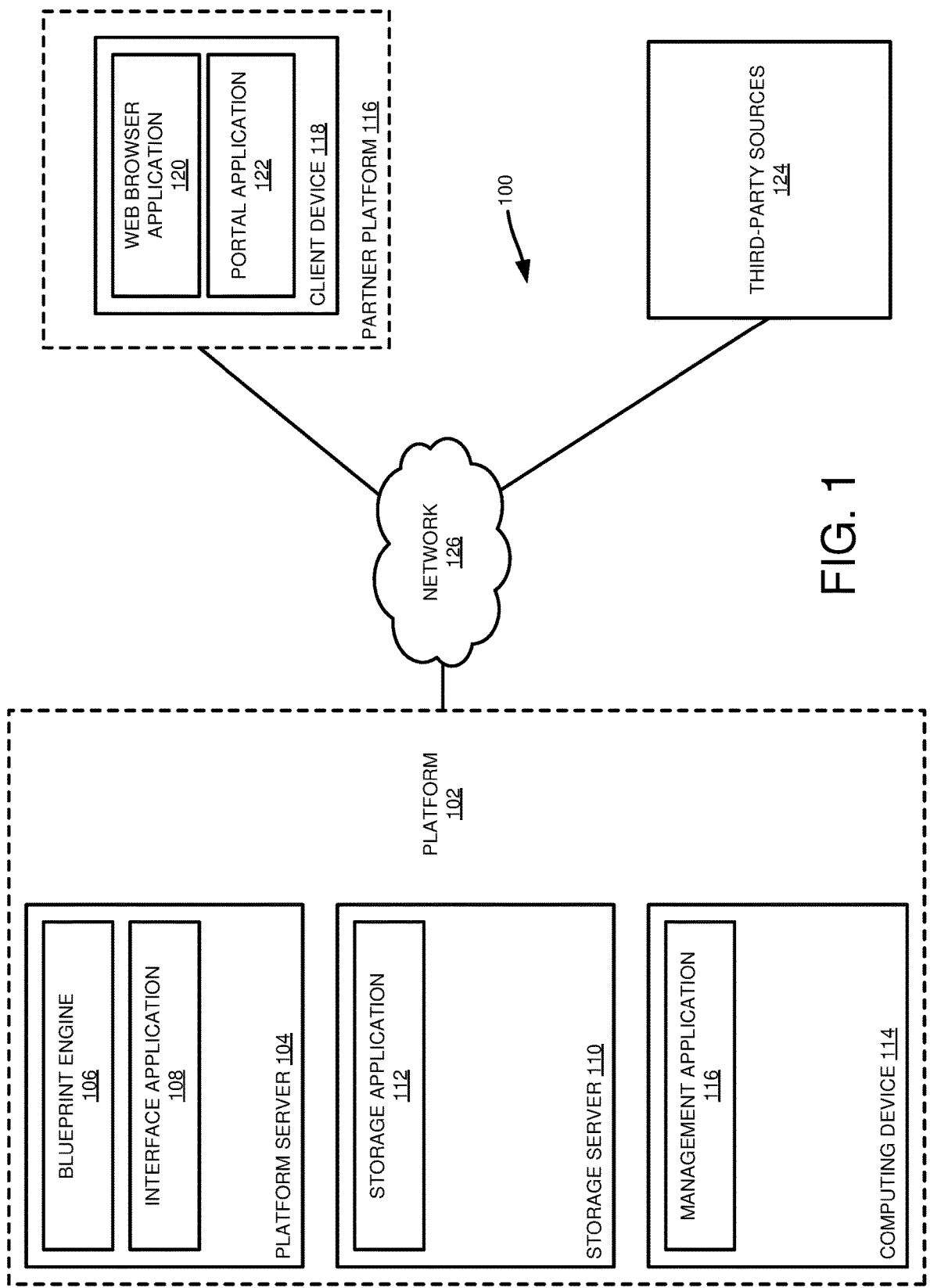
FIG. 1 illustrates an example computing environment in which a collaborative data management and deployment provides a blueprint engine allowing an individual to customize a workflow, according to an example embodiment.

The following detailed description includes references to the accompanying figures. In the figures, similar symbols typically identify similar components, unless context dictates otherwise. The example embodiments described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

Prior techniques associated with developing an effective data deployment scheme, such as a distributed marketing program, not only require a relatively significant amount of manual coordination and time (e.g., from weeks to months) but can also be computing and network resource intensive. For example, distributed marketing often involves a large amount of heterogeneous data sets like product data, pricing data, third-party partner data, target audience data, and so on. Further, because the data may be stored in various locations and require different credentials for access, this compounds the amount of computation required in coordinating data deployment schemes representing a distributed marketing program.

To address these shortcomings, embodiments presented herein disclose a collaborative data management and delivery platform providing a mechanism for designing customizable data deployment programs such as marketing campaigns to target audiences. More particularly, the platform connects various entities corresponding to brands, partners, and third-parties for sharing data such as best practices, messaging, audiences, and co-op budgets with distributed locations with one another. As a result, the platform provides a unified resource that consolidates data from heterogeneous sources for access by a user in developing a program.

In addition, the platform provides various tools to facilitate the design of such programs by a user to reduce creation time and computing resources in doing so. As further described herein, the platform includes a blueprint engine that generates an organized collection of data component inputs for a modular deployment program for use within the platform and customizable for a client user of the platform. Specifically, the blueprint engine provides a graphical user interface that enables the user to select from a variety of component inputs in creating a given marketing program, such as advertisement-specific features, fields for dynamic input, billing components, notification inputs, target audiences, and the like, each of the inputs mapping to some sort of data maintained or accessible by the platform. Doing so creates a "blueprint" of a collection of data to be deployed to automate the assembly and activation of the deployment program. A blueprint may be a template that is a set of object publishers, each of which is mapped to a data set on which it operates. Once created, the platform translates semi-structured data sets into object hierarchies as specified in a given blueprint. Further, each blueprint uses a system of "references" which tie objects together to reflect a hierarchy in the underlying data (or even when driven by distinct but related data sets). Client users may thereafter provide data sets for a given blueprint for automatically deploying to one or more of the entities, such as social media networks, e-commerce websites, and multimedia content providers.

In addition, the blueprint itself may provide added flexibility for a given data deployment program, such that if source data in a deployed program changes, corresponding objects are constructed, updated, or torn down as needed.

Advantageously, users may assemble blueprints to quickly develop marketing programs based on client needs. The techniques described herein significantly reduce the amount of time previously required to do so (e.g., from weeks to months) to several hours. By consolidating or linking to data from a variety of sources owned by different entities, the platform reduces computing resources required by a given system (e.g., the user's system) in accessing that data. Further, the blueprint engine of the platform provides greater flexibility in customizing a program for deployment, e.g., by allowing a user to drag and drop desired components into a visual builder interface.

FIG. 1 illustrates an example computing environment 100 in which a collaborative data management and delivery platform 102 functions with one or more partner platforms 116 and third-party sources 124 over a network 126 (e.g., the Internet), according to an example embodiment. As shown, the collaborative data management and delivery platform (referred to herein as the "platform") 102 may include one or more platform servers 104, storage servers 110, and computing devices 114. The platform 102 is a unified service that connects multiple entities, such as the partner platforms 116 and third-party sources 124 with one another to, e.g., share data that each entity might use in generating data deployment programs, such as effective marketing campaigns. Each of the platform server 104, storage server 110, and the computing device 114 may be a physical computing system (e.g., a desktop computer, laptop computer, workstation, etc.) or a virtual computing instance executing on a cloud network.

Illustratively, the platform server 104 includes a blueprint engine 106 and an interface application 108. The blueprint engine 106 provides various functions around generating a blueprint used in deploying a marketing campaign for a client user (e.g., a brand company). A blueprint comprises a collection of one or more objects to be mapped to a data set for a given marketing campaign. An object pertains to an online data unit that is generated, updated, or destroyed (e.g., via an application programming interface (API) call), such as an advertisement displayed on a social media website, an order made by a brand client and stored by the platform 102, or an invoice. Such objects may be made available for a user to use in designing a blueprint.

For example, the platform 102 may provide a graphical user interface (GUI) that allows a user, such as an operator of the computing device 114 (e.g., a management console providing a management application 116), to select which object components to include in a given blueprint. Further, the GUI may comprise a visual builder that graphically depicts the object components and allow the user to drag and drop such components into a window representing the blueprint, also further allowing the user to define a hierarchy of the object components, as further described herein.

The partner platform 116 includes one or more client devices 118, which may be a physical computing system (e.g., a desktop computer, laptop computer, workstation, etc.) or a virtual computing instance executing on a cloud network. The partner platform 116 may be provided access to the platform 102 via an online portal managed by an interface application 108 executing on the platform server 104. The portal may be provided as a web-based portal accessed via a web browser application 120 or as a standalone portal application 102. Through the portal, a partner may transmit an order including specifications for a blueprint to eventually be used to deploy a marketing program.

In addition, the partner platform 116 may integrate with the platform 102 via a platform-side API or by providing the platform 102 with a partner-side API. The APIs enable the partner platform 116 to transmit (e.g., via a push or pull model) data for use in a marketing program to the platform 102. For example, a real estate brand may provide data pertaining to listings, such as homes for sale, commercial developments for sale, pricing data, advertising best practices, and the like. An insurance brand may provide rates for different types of insurance, broker information, referral generation data, and so on. In an embodiment, the platform 102 is configured to process semi-structured data that is separated into fields.

The storage server 110 includes a storage application 112. The storage application 112 provides an interface for storing client data, performance analytics, conversion data, lead data, and the like into a database (e.g., a relational database). The storage application 112 may also be used as a repository for object component inputs provided by partner platforms 116 or third-party sources 124 to improve computational performance of the blueprint engine 106 in generating a blueprint. The computing device 114 may be indicative of a console system used by a system administrator, an individual with superuser privileges, etc. for management of various aspects of the platform 102. For example, the computing device 114 may include a management application 116 to interface with the applications hosted by the platform server 104, create profiles associated with clients, configure various settings of the collaborative data management and deployment 102, and the like.

Figure 7:
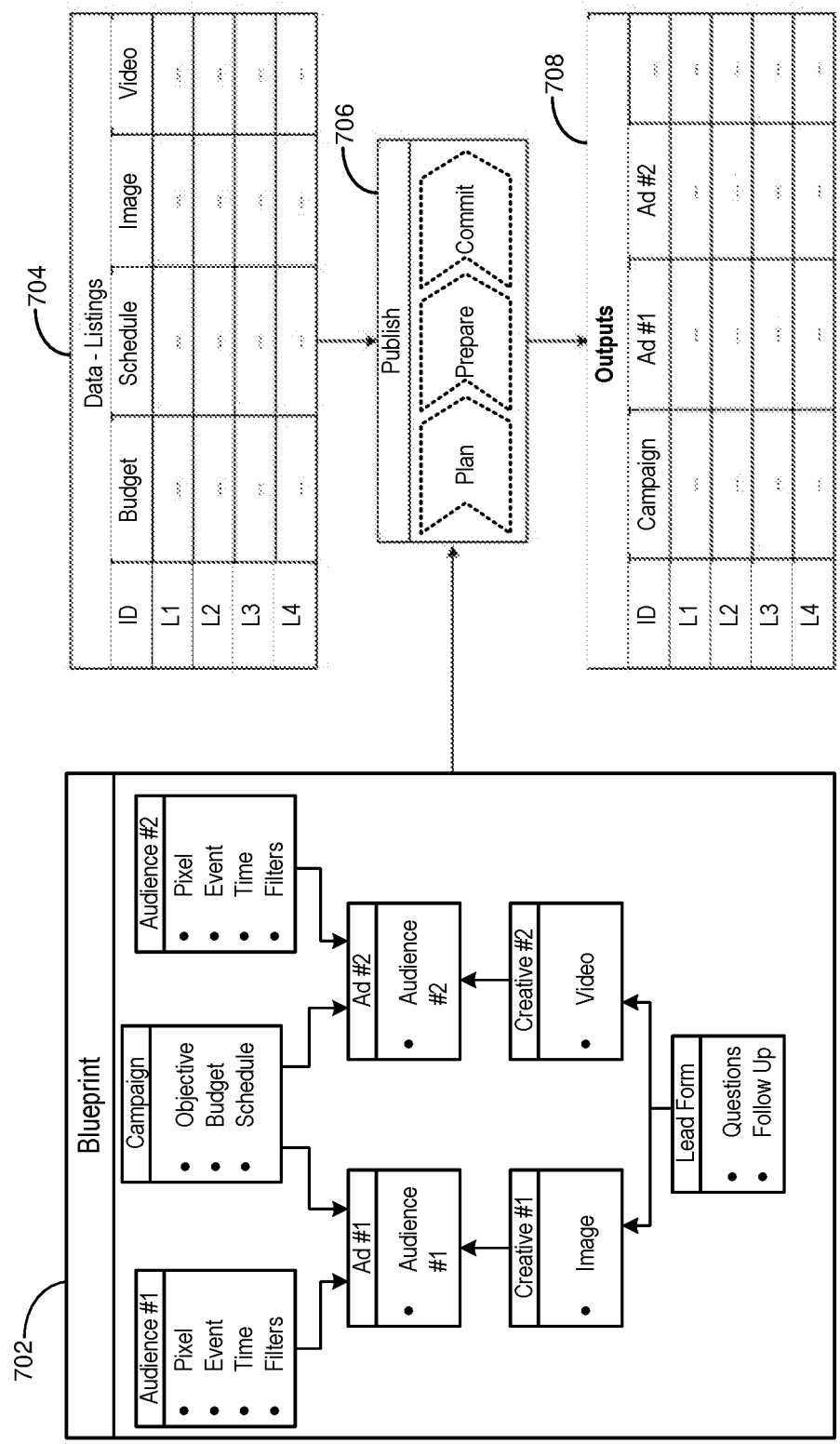
FIG. 7 illustrates a conceptual diagram of applying partner data to a blueprint to provide a marketing program, according to an embodiment.

Of course, other embodiments of the platform 102 may be implemented. FIG. 7 provides another example architecture for the computing environment 102 described above. FIG. 10 provides examples of automated workflows that feed into and out of the blueprint engine 106.

Figure 2:
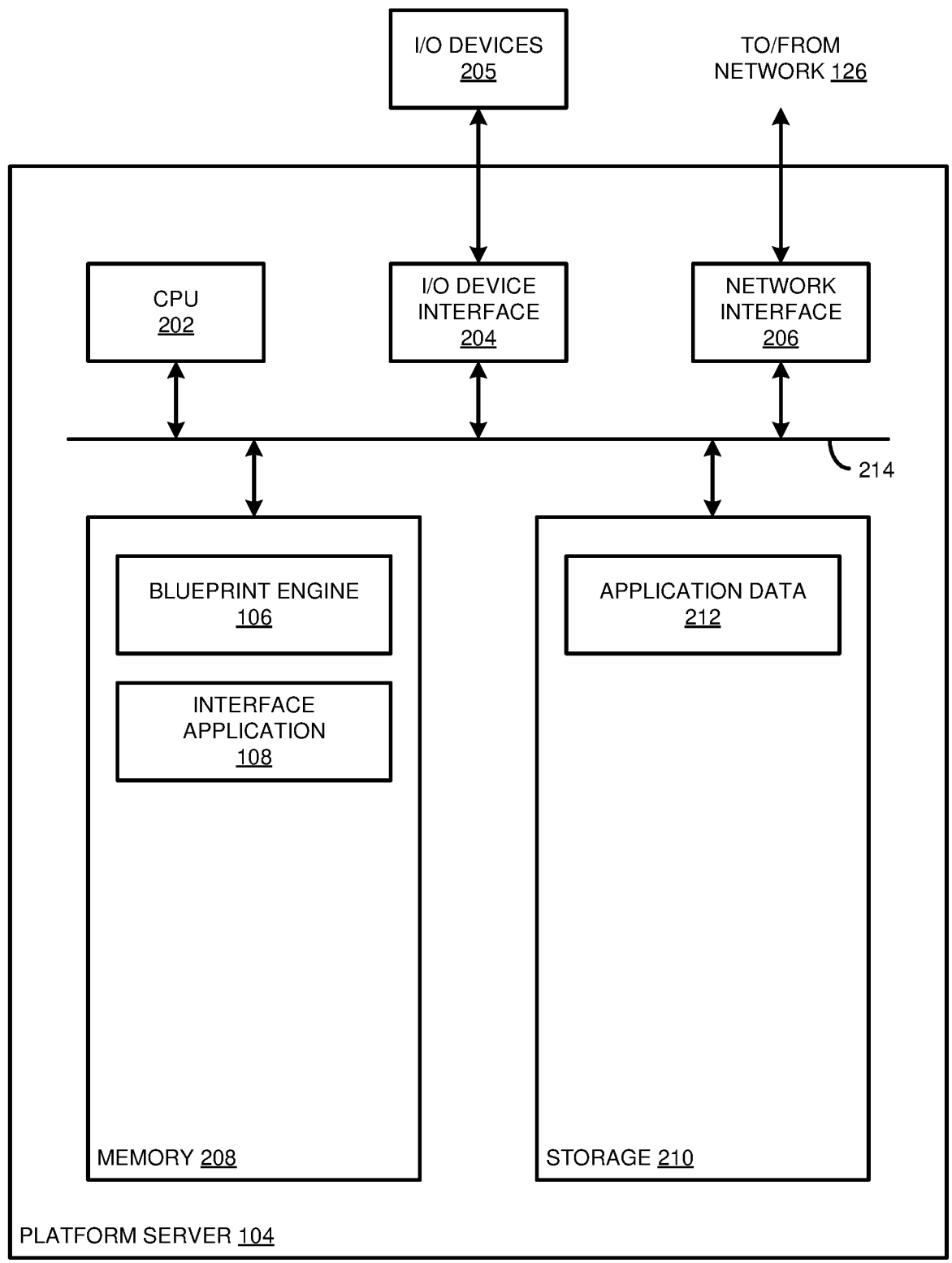
FIG. 2 further illustrates an example block diagram of the platform server described relative to FIG. 1, according to an embodiment.

FIG. 2 further illustrates the platform server 104, according to an example embodiment. As shown, the platform server 104 includes, without limitation, a central processing unit (CPU) 202, an I/O device interface 204, one or more I/O devices 205, a network interface 206, a memory 208, and a storage 210, each interconnected via a hardware bus 214. Of course, an actual platform server 104 will include a variety of additional hardware components.

The CPU 202 retrieves and executes programming instructions stored in the memory 208 (e.g., of the platform application 104). Similarly, the CPU 202 stores and retrieves data residing in the storage 210. The hardware bus 214 is used to transmit instructions and data between the CPU 202, storage 210, network interface 206, and the memory 208. CPU 202 is included to be representative of a single CPU, multiple CPUs, a single CPU having multiple processing cores, and the like. The memory 208 is generally included to be representative of memory and storage on a mobile device, e.g., DDR and flash memory spaces. The network interface 206 may be embodied as any hardware, software, or circuitry (e.g., a network interface card) used to connect the platform server 104 over a network and providing the network communication component functions described above.

The I/O device interface 204 allows the I/O devices 205 to communicate with hardware and software components of the platform server 104. The I/O devices 205 may be embodied as any type of input/output device connected with or provided as a component to the platform server 104, such as keyboards, mice, and printers.

Illustratively, the memory 208 includes the blueprint engine 106 and the interface application 106, which carries out functions described herein relative to FIG. 1. The storage 210 includes application data 212, which may be embodied as any data used by the blueprint engine 106 and the interface application 108 to carry out the functions described herein.

Figure 3:
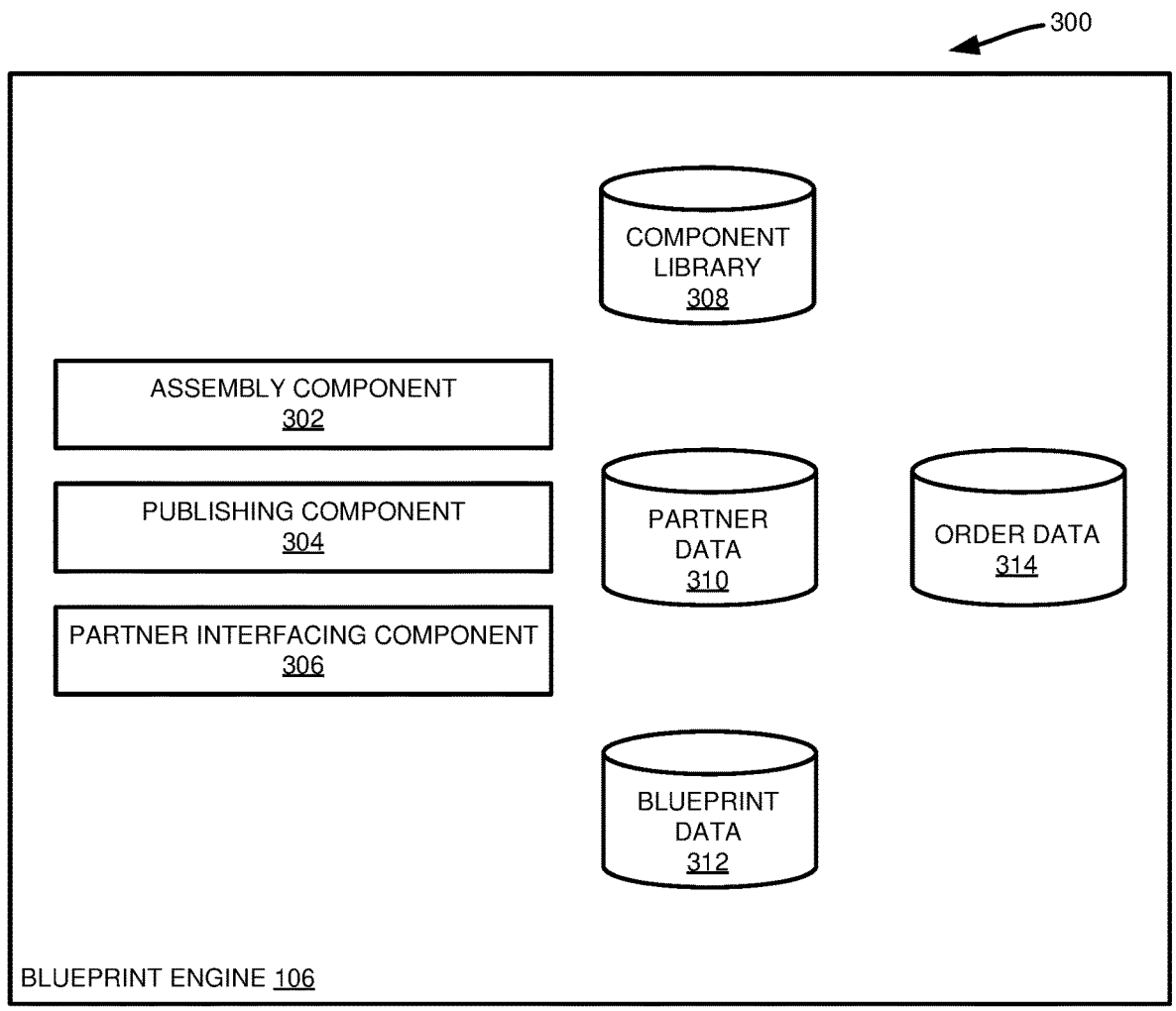
FIG. 3 further illustrates an example block diagram of the blueprint engine described relative to FIG. 1, according to an embodiment.

Referring now to FIG. 3, the platform server 104, in executing the blueprint engine 106, may establish an environment 300. As shown, the environment 300 includes an assembly component 302, a publishing component 304, and a partner interfacing component 306. The environment 300 further includes a component library 308, partner data 310, blueprint data 312, and order data 314.

The component library 308 may be embodied as any data objects that may be included in a given blueprint. Such components may include desired advertisement feature elements (e.g., predefined campaign templates, ad groups, creatives, audiences, lead forms, product sets, images, and videos, and so on), dynamic input control elements (e.g., radio and drop-down boxes, text and number inputs, image and video upload mechanisms, and so on), billing elements (e.g., charge elements, invoice elements, manual input elements, and so on), notification elements (e.g., leads, orders, approvals, and so on), etc.

The partner data 310 includes data obtained from a partner platform 116 (e.g., via push or pull mechanisms). For example, such data can include data sets used for applying to a blueprint. As an example, partner data 310 transmitted by a retail marketer may include active real estate listings, such as homes for sale, apartments for rent, price data, location data, and so on.

The blueprint data 312 may include one or more blueprints assembled by a user. FIG. 7 provides an example conceptual diagram of a blueprint at 702. As shown, the blueprint 702 includes multiple objects having different attributes (also referred to herein as "facets") as well as object publishers. For example, an audience #1 object includes parameters for pixels, events, times, and filters. As another example, a campaign object includes parameters for objective, budget, and schedule. Further, each of the objects may be organized hierarchically. Particularly, a given object may depend on one or more other objects, which the blueprint may specify. For example, the ad #1 object has dependencies on the audience #1, campaign, and creative #1 objects. The blueprint engine 106 may use a system of references to associate dependencies with one another to reflect hierarchy in the underlying data (or even when driven by distinct but related data sets). For example, a "homes for sale" data set can be organized by city and agent. The resulting blueprint can provide a hierarchy of agents under campaigns, cities under target audiences, and listings under ads. In an embodiment, a user may assemble the blueprints using a visual builder having graphic components representing each object.

An object publisher may include an object prototype and is further configured using a set of compatible facets. Each facet may include parameters or variables specified, such as date ranges and other values. Such parameters may be specified by a client user, e.g., in order data 314.

Turning back to FIG. 3, in an embodiment, the assembly component 302 may be embodied as any device, circuitry, or software for obtaining a selection of input components from a user and linking such components based on defined hierarchies. The selection may be specified through a variety of ways, such as through a graphical user interface (GUI) that allows the user to indicate which object components to include in a given blueprint. Further, the GUI may comprise a visual builder allowing a user to drag and drop the components into a canvas representing the blueprint (e.g., similar to the blueprint 702).

In an embodiment, the publishing component 304 may be embodied as any device, circuitry, or software for deploying blueprint data 312 to one or more third-party marketing channels (e.g., social media websites, news readers, review websites, search engines, etc.) given one or more data sets (e.g., the partner data 310) as input. FIG. 7 at 704 depicts an abstraction of the publishing process in which partner data 310 (as Listings in display 704) is applied to the blueprint 702. The publishing component 304 undergoes a three-phase plan, prepare, and commit process (depicted as element 706), which results in various data outputs, e.g., campaigns, ads, etc. (as Listings in display 708).

Figure 8:
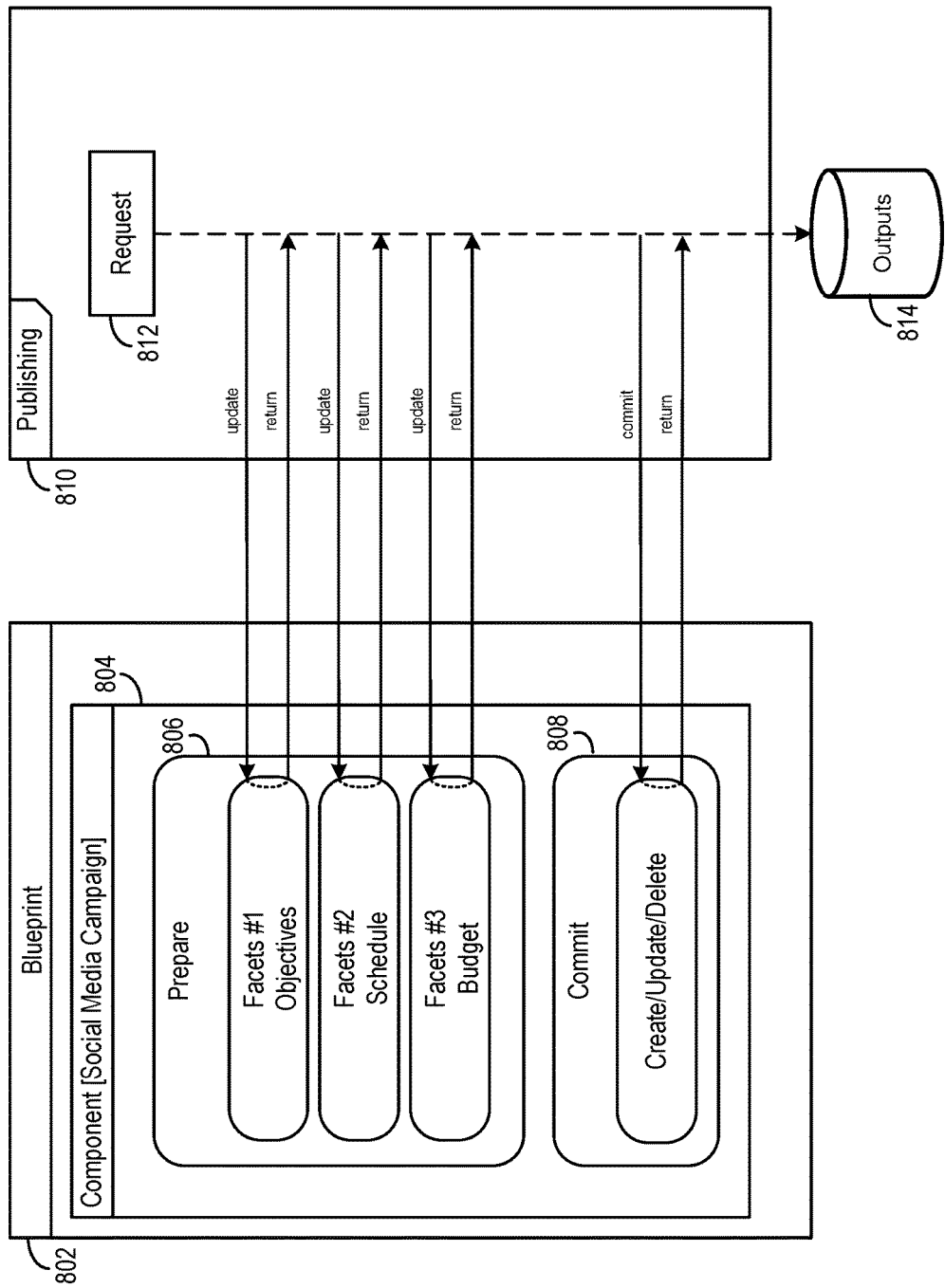
FIG. 8 illustrates a conceptual diagram of updating a marketing program based on changes to partner data associated with an underlying blueprint, according to an embodiment.

FIG. 8 further illustrates the process as applied to facets for an example social media campaign object 804 in a blueprint 802. As stated, a blueprint is a set of object publishers, each of which is mapped to a data set on which it operates. A publisher may start with a prototype and is further configured using a set of blueprint facets that are compatible with that prototype. Illustratively, the social media campaign object incorporates a number of blueprint facets labeled Objectives, Schedule, and Budget under a prepare phase 806. Each facet may have parameters associated with it. The values of the parameters can be static (e.g., a specific date) or may refer to fields in a data set (e.g., {{starting_date}}). Further, each of the facets are listed in a sequential order. Under the prepare phase 806, each of the facets are invoked in the configured order, such that the output from the preceding facet is input to the next facet in succession. For example, output from the Objectives facet is provided as input for the Schedule facet. Further shown, the social media campaign object 804 also incorporates a commit phase 808, in which any changes performed are synchronized (e.g., with a target social media service). As shown in the right-hand portion of FIG. 8, the blueprint 802 may undergo a publishing phase 810. The publishing phase 810 comprises actions for the platform server 102 reading the blueprint 802 and executing the prepare and comment phases 804 and 808, respectively. For instance, the publishing phase 810 includes a request 812. The request 812 may include information about the data being processed, an identifier associated with the requesting user, substitutions for placeholders in the request, and so on. The publishing phase 810 may transform the request 812 into one or more outputs 814. The outputs 814 may be persisted to a database (e.g., managed by the storage server 110), e.g., for use by other components of the blueprint 802 (e.g., by reference), for status reporting to the user, or for cross-referencing with campaign performance data.

Turning back to FIG. 3, the illustrative publishing component 304 is also configured to update a marketing program deployed from a blueprint based on changes in partner data 310 associated with the data set. Continuing the example of a real estate data set, assume that changes are made to the data, such as several listings going inactive or the price data for some listings changing. The blueprint engine 106 may periodically obtain updated data sets from the partner platform 116 reflecting such changes. In response to detecting changes in the updated data sets, the publishing component 106 may resync the data with the underlying blueprint to ensure that the resulting output data remains accurate and up-to-date. The process may be executed using a variety of techniques, such as through REST APIs, AWS Lambda functions, and the like.

In an embodiment, the partner interfacing component 306 may be embodied as any device, circuitry, or software for receiving data from or transmitting data to a partner platform 116. The partner interfacing component 306 may obtain order data 314 (e.g., using push or pull mechanisms) used to generate a blueprint or populate facets for deploying a marketing program using a blueprint. The component 306 may also execute approval, billing, and notification workstreams involving the partner platform 116.

Figure 4:
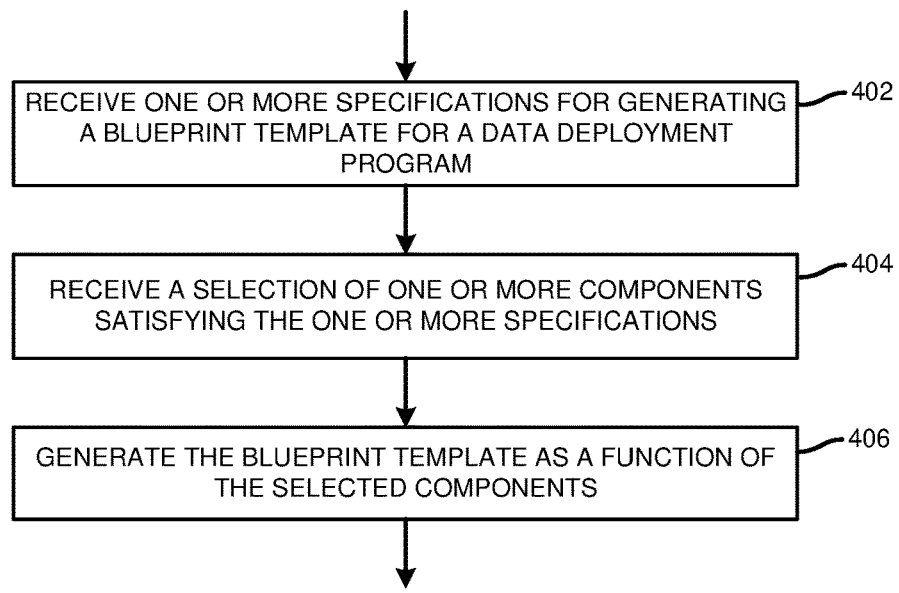
FIG. 4 illustrates an example method flow for creating a blueprint using a variety of inputs, according to an embodiment.

Referring now to FIG. 4, the platform server 104, in operation, may perform a method 400 for creating a blueprint template within the platform 102. As shown, the method 400 begins in block 402 in which the platform server 104 (via the blueprint engine 106) receives one or more parameters for generating a blueprint for a marketing program. The one or more parameters may be specified in an order transmitted to the platform 102 by a client device (e.g., via a portal on the partner platform 116).

In block 404, the platform server 104 receives a selection of one or more blueprint components satisfying the one or more parameters. For example, a user (e.g., an admin or an individual with superuser privileges on the platform 102) may use a visual builder application to select which object components should be included in the blueprint as well as hierarchies associated with each component.

In block 406, the platform server 104 generates the blueprint as a function of the selected components. Particularly, the platform server 104 may assemble the components and create associations based on the hierarchical definitions specified by the user. Once the blueprint is created, the platform server 104 may store the blueprint for later use on a given data set. The blueprint can be used for various data sets, allowing for portability for distinct sets of partner data or even across different partners.

Figure 5:
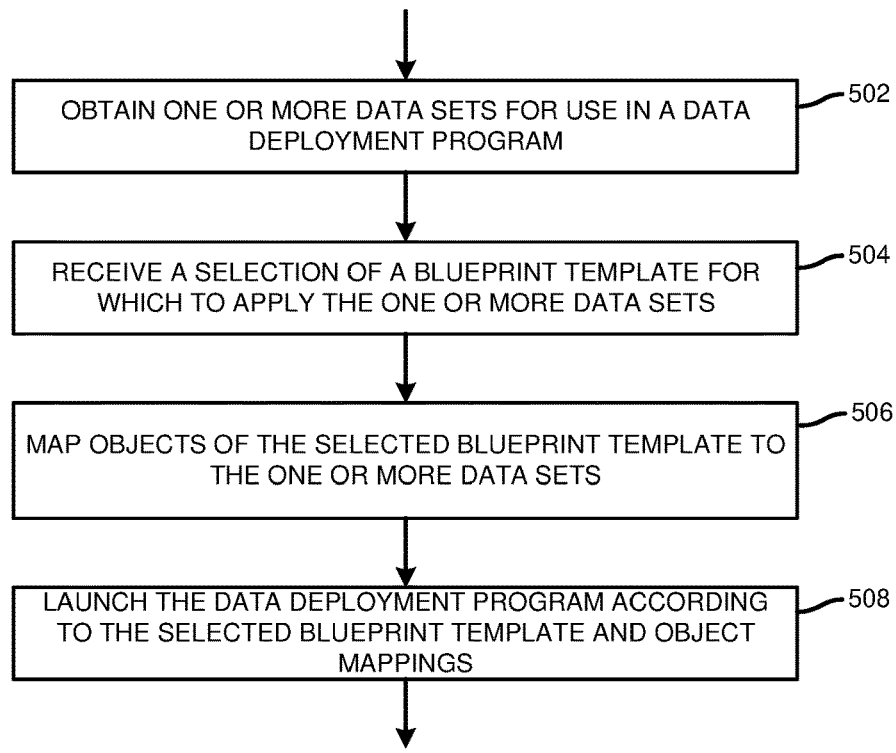
FIG. 5 illustrates an example method flow for deploying a marketing program using a blueprint, according to an embodiment.

Referring now to FIG. 5, the platform server 104, in operation, may perform a method 500 for deploying a program from a generated blueprint. As shown, the method 500 begins in block 502, in which the platform server 104 (via the blueprint engine 106) obtains one or more data sets for use in a marketing program. As stated, the data sets may be obtained from a partner platform 116 (or locally within the platform 102) via an API call.

In block 504, the platform server 104 receives a selection of a blueprint for which to apply the one or more data sets. The selection may be specified in a blueprint order created by a partner or an admin of the platform 102. In block 506, the platform server 104 maps objects of the selected blueprint to the one or more data sets. In block 508, the platform server 104 publishes the selected blueprint. FIGS. 7 and 8, previously described above, depict an example mapping and publishing of a blueprint. As shown, the publishing step may involve a three-phase plan-prepare-commit process. Such process enables a user to preview changes in various levels of detail at each of the plan and prepare phases.

Figure 6:
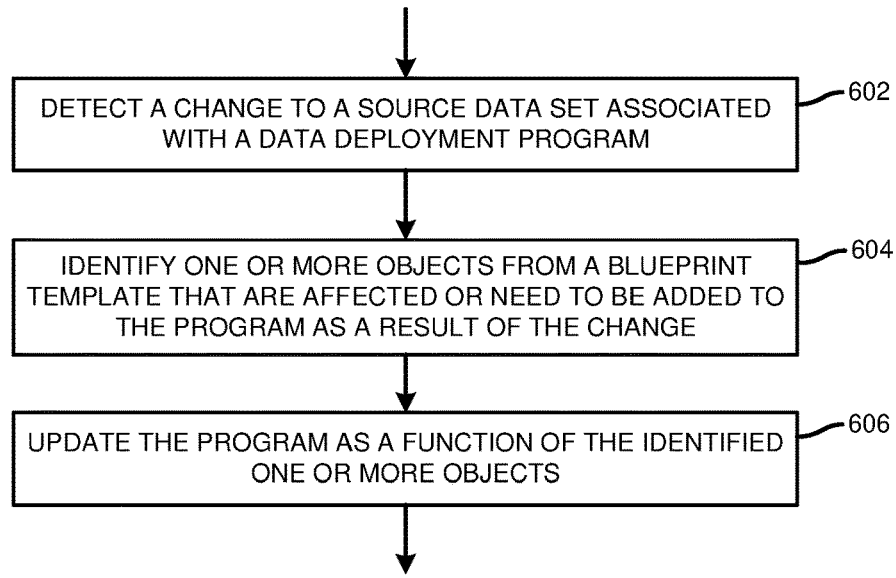
FIG. 6 illustrates an example method flow for updating a blueprint based on a change in an underlying data set, according to an embodiment.

Referring now to FIG. 6, the platform server 104, in operation, may perform a method 600 for updating a marketing program published from a blueprint based on changes in data. As shown, the method 600 begins in block 602, the platform server 104 detects a change to a source data set associated with a marketing program spawned from a blueprint. For example, the platform server 104 may periodically obtain updates to the data set, either initiated as a request by the platform server 104 to the partner platform 116 or by periodically receiving the data from the partner platform 116. In block 604, the platform server 104 identifies one or more objects from the blueprint that are affected by or need to be added to the marketing program as a result of the change. The platform server 104 may additionally identify facets within the objects that need to be modified. In block 606, the platform server 104, update the marketing program as a function of the identified one or more objects. For example, the platform server 104 may destroy obsolete data, update facet values, add new objects corresponding to new data, and the like.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration only, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more computer-readable media which may be read and executed by one or more processors. A computer-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided in sub-modules, sub-processes or other units of computer code or data as may be required by a particular design or implementation of the computing device.

In the drawings, specific arrangements or orderings of elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships, or associations between elements may be simplified or not shown in the drawings so as not to obscure the disclosure.

This disclosure is considered to be exemplary and not restrictive. In character, and all changes and modifications that come within the spirit of the disclosure are desired to be protected. While particular aspects and embodiments are disclosed herein, other aspects and embodiments will be apparent to those skilled in the art in view of the foregoing teaching.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for generating an organized collection of data inputs for a data deployment program, comprising:
    receiving, from a client device and by a platform server, a specification of one or more parameters to be satisfied for the data deployment program, wherein the data deployment program is a marketing campaign program interconnecting one or more networks of local partner entities;
    presenting, via a graphical user interface to a second client device and by the platform server, the specification of the one or more parameters and a plurality of objects, each object corresponding to a software data element for the data deployment program, each object being mappable to a data set of a plurality of data sets maintained or accessible by the platform server, and each object being depicted as a selectable graphical element on the graphical user interface, wherein at least one of the plurality of data sets is obtained from the one or more networks of the local partner entities;
    receiving, via the graphical user interface presented to the second client device and by the platform server, a selection of one or more of the plurality of objects satisfying the specification of the one or more parameters;
    receiving, via the graphical user interface and by the platform server, one or more hierarchical definitions to be associated with the selection of the one or more of the plurality of objects; and
    generating, by the platform server, a template for the data deployment program as a function of the selected objects and the one or more hierarchical definitions, wherein generating the template comprises, in part, associating, within the selected objects, a first object with a second object according to the one or more hierarchical definitions.

2. The computer-implemented method of claim 1, further comprising:
    receiving, by the platform server, the plurality of data sets to be used with the data deployment program;
    mapping, by the platform server, each of the selected objects to the plurality of data sets; and
    launching, by the platform server, the data deployment program according to the template and the mapping of each of the selected objects to the plurality of data sets.

3. The computer-implemented method of claim 2, further comprising:
    detecting, by the platform server, a change to one of the plurality of data sets;
    identifying, by the platform server and based on the mapping of each of the selected objects to the plurality of data sets, one or more modifications to be made to the data deployment program based on the detected change; and
    updating, by the platform server, the data deployment program as a function of the identified one or more modifications.

4. The computer-implemented method of claim 3, wherein the one or more modifications to be made to the data deployment program comprises identifying one or more of the selected objects to update based on the change.

5. The computer-implemented method of claim 3, wherein the one or more modifications to be made to the data deployment program comprises identifying one or more additional objects to associate with the data deployment program.

6. The computer-implemented method of claim 1, wherein the plurality of objects is provided via the graphical user interface by a component library, and wherein the plurality of objects includes at least one of an advertisement feature element, dynamic input control element, billing element, or a notification element.

7. One or more non-transitory computer-readable media comprising a plurality of instructions, which, when executed by a processor, causes a platform server to:
 receive, from a client device, a specification of one or more parameters to be satisfied for a data deployment program, wherein the data deployment program is a marketing campaign program interconnecting one or more networks of local partner entities;
 present, via a graphical user interface to a second client device, the specification of the one or more parameters and a plurality of objects, each object corresponding to a software data element for the data deployment program, each object being mappable to a data set of a plurality of data sets maintained or accessible by the platform server, and each object being depicted as a selectable graphical element on the graphical user interface, wherein at least one of the plurality of data sets is obtained from the one or more networks of the local partner entities;
 receive, via the graphical user interface presented to the second client device, a selection of one or more of the plurality of objects satisfying the specification of the one or more parameters;
 receive, via the graphical user interface, one or more hierarchical definitions to be associated with the selection of the one or more of the plurality of objects; and
 generate a template for the data deployment program as a function of the selected objects and the one or more hierarchical definitions, wherein to generate the template comprises, in part, to associate, within the selected objects, a first object with a second object according to the one or more hierarchical definitions.

8. The one or more non-transitory computer-readable media of claim 7, wherein the plurality of instructions, when executed by the processor, further causes the platform server to:
 receive the plurality of data sets to be used with the data deployment program;
 map each of the selected objects to the plurality of data sets; and
 launch the data deployment program according to the template and the mapping of each of the selected objects to the plurality of data sets.

9. The one or more non-transitory computer-readable media of claim 8, wherein the plurality of instructions, when executed by the processor, further causes the platform server to:
 detect a change to one of the plurality of data sets;
 identify, based on the mapping of each of the selected objects to the plurality of data sets, one or more modifications to be made to the data deployment program based on the detected change; and
 update the data deployment program as a function of the identified one or more modifications.

10. The one or more non-transitory computer-readable media of claim 9, wherein the one or more modifications to be made to the data deployment program comprises identifying one or more of the selected objects to update based on the change.

11. The one or more non-transitory computer-readable media of claim 9, wherein the one or more modifications to be made to the data deployment program comprises identifying one or more additional objects to associate with the data deployment program.

12. The one or more non-transitory computer-readable media of claim 7, wherein the plurality of objects is provided via the graphical user interface by a component library, and wherein the plurality of objects includes at least one of an advertisement feature element, dynamic input control element, billing element, or a notification element.

13. A platform server, comprising:
 a processor; and
 a memory storing a plurality of instructions, which, when executed by the processor, causes the platform server to:
  receive, from a client device, a specification of one or more parameters to be satisfied for a data deployment program, wherein the data deployment program is a marketing campaign program interconnecting one or more networks of local partner entities;
  present, via a graphical user interface to a second client device, the specification of the one or more parameters and a plurality of objects, each object corresponding to a software data element for the data deployment program, each object being mappable to a data set of a plurality of data sets maintained or accessible by the platform server, and each object being depicted by a selectable graphical element on the graphical user interface, wherein at least one of the plurality of data sets is obtained from the one or more networks of the local partner entities;
  receive, via the graphical user interface presented to the second client device, a selection of one or more of the plurality of objects satisfying the specification of the one or more parameters;
  receive, via the graphical user interface, one or more hierarchical definitions to be associated with the selection of the one or more of the plurality of objects; and
  generate a template for the data deployment program as a function of the selected objects and the one or more hierarchical definitions, wherein to generate the template comprises, in part, to associate, within the selected objects, a first object with a second object according to the one or more hierarchical definitions.

14. The platform server of claim 13, wherein the plurality of instructions, when executed by the processor, further causes the platform server to:
 receive the plurality of data sets to be used with the data deployment program;
 map each of the selected objects to the plurality of data sets; and
 launch the data deployment program according to the template and the mapping of each of the selected objects to the plurality of data sets.

15. The platform server of claim 14, wherein the plurality of instructions, when executed by the processor, further causes the platform server to:
 detect a change to one of the plurality of data sets;
 identify, based on the mapping of each of the selected objects to the plurality of data sets, one or more modifications to be made to the data deployment program based on the detected change; and update the data deployment program as a function of the identified one or more modifications.

16. The platform server of claim 15, wherein the one or more modifications to be made to the data deployment program comprises identifying one or more of the selected objects to update based on the change.

17. The platform server of claim 15, wherein the one or more modifications to be made to the data deployment program comprises identifying one or more additional objects to associate with the data deployment program.

18. The platform server of claim 13, wherein the plurality of objects is provided via the graphical user interface by a component library, and wherein the plurality of objects includes at least one of an advertisement feature element, dynamic input control element, billing element, or a notification element.

\* \* \* \* \*